D. GUPTAIL.
Harvester Rake.
No. 28,854.
Patented June 26, 1860.
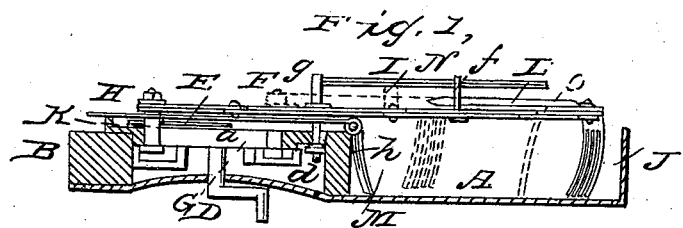
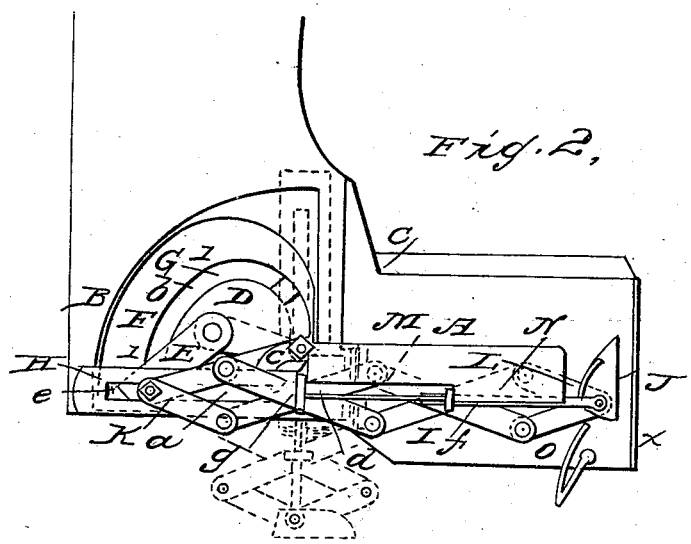

UNITED STATES PATENT OFFICE.

DANIEL GUPTAIL, OF ELGIN, ILLINOIS.

IMPROVEMENT IN RAKING ATTACHMENTS FOR HARVESTERS.

Specification forming part of Letters Patent No. 28,854, dated June 26, 1860.

*To all whom it may concern:*

Be it known that I, DANIEL GUPTAIL, of Elgin, in the county of Kane and State of Illinois, have invented a new and Improved Raking Attachment for Harvesters; and I do hereby declare that the following is a full, clear, and exact description of the same, reference being had to the annexed drawings, making a part of this specification, in which—

Figure 1 is a vertical section of the platform and frame of a harvester, taken in the line $x$ $x$, Fig. 2; Fig. 2, a plan or top view of the same.

Similar letters of reference indicate corresponding parts in the two figures.

This invention consists in an arrangement of a system of levers known as the "lazy-tongs" with rakes and a peculiar operating mechanism, substantially as hereinafter described, whereby a very simple and efficient raking device is obtained, and one that may be applied to all harvesters that have their sickles behind the ground-wheel.

To enable those skilled in the art to fully understand and construct my invention, I will proceed to describe it.

A represents the platform of a reaper; and B is the main frame, to the back part of which the sickle-bar C is attached. In the back part of the main frame B there is placed a vertical shaft, D, to the upper end of which an arm, C, is attached at right angles. The upper part of the shaft D has its bearing in a metal plate, F, which has a cam-shaped slot, G, made in it. The form of this slot is shown clearly in Fig. 2, $a$ being a straight portion; $b$, a curved portion; and $c$, a short portion, curved about concentric with a portion of $b$, (indicated between the points 1 1.)

To the upper surface of the main frame B, at its back end and inner side, there is attached by a bolt, $d$, a bar, H, which is slotted longitudinally nearly its whole length, as shown at $e$. The bolt $d$ passes through the bar H near one end, and said bolt is allowed to turn freely in the plate F.

I represents a system of levers, known as the "lazy-tongs," the fixed fulcrum of which is on the bolt $d$. To one end of the lazy-tongs a rake, J, is attached, said rake projecting down toward the platform A, and nearly touching it. The opposite end of the lazy-tongs has a pin, K, fitted in it, and this pin projects down through the slot $e$ in the bar H, and through the slot G of plate F.

The arm E of the shaft D is directly over the plate F, and said arm is sufficiently long to traverse over the whole of the slot G as the shaft D rotates. The rake J has a guide-rod, L, attached to it, and this guide-rod works through an eye, $f$, on the lazy-tongs and also through an eye, $g$, on the bolt $d$.

To the outer end of the bar H a rake or pressure-plate, M, is attached by elastic rods $h$, so as to allow said plate to have a certain degree of elasticity or yielding movement.

To the upper parts of the eyes $f$ $g$ a frame, N, is attached. This frame may be formed of metal rods, covered with canvas or any suitable cloth, and extending over the lazy-tongs.

To the back part of the platform A an upright slightly inclined elastic wire or rod, O, is attached, said wire or rod being near the outer end of the platform.

The operation is as follows: As the harvester is drawn along, the shaft D is rotated from the driving or ground wheel by any suitable means. The arm E of the shaft D, as the latter rotates, forces the pin K around the slot G in plate F. This movement of the pin K in the slot operates the lazy-tongs and the bar H, the latter being moved from a position at right angles or transverse with the main frame to a position longitudinal with it, as shown in red, Fig. 2, the bar H being vibrated back and forth from one of these positions to the other. The lazy-tongs are expanded and contracted by the movement of pin K—expanded when the bar H has a transverse position on the main frame B, and contracted when said bar has a longitudinal position thereon—the lazy-tongs being contracted while the pin K moves in the straight part $a$ of slot G, and causing the rake J to draw the cut grain on the platform toward the rake or plate M, as shown in blue, Fig. 1. The frame N prevents the grain that is being cut from falling on the platform and interfering with the operation of the rake while the latter is in operation. When the rake J has reached the end of its stroke toward the plate M, and has gathered the grain on the platform between it and the plate M, the lazy-tongs are in a fully contracted state, and the pin K, in passing through the short curve $c$ of slot G, moves the bar H to a position longitudinal with the main frame, and consequently the rake J and plate M, with their contents, will be turned off the back of the platform, as shown in red, Fig. 2, and as the pin K passes around the larger curved portion *b* of slot G the lazy-tongs will be expanded and the rake J moved off from the plate, so that the gavel will be released and allowed to drop on the stubble behind the main frame. As the lazy-tongs are expanded, they are moved around over the platform A to a position parallel with the sickle, so as to again sweep over the platform and gather the grain thereon between it and plate M. The spring-rod O elevates the end of the lazy-tongs as they pass over the back part of the platform, and compensates for any deflection of the lazy-tongs which might occur from use and wear or a lack of requisite stiffness of its parts.

Having thus described my invention, what I claim as new, and desire to secure by Letters Patent, is—

1. The employment or use of the lazy-tongs I, with rake J attached, in connection with the bar H, with the rake or plate M attached, the lazy-tongs and bar being operated by the revolving arm E, pin K, and slot G, substantially as described.

2. The frame N, in combination with the lazy-tongs I, for the purpose of preventing the grain that is being cut, while the rake is in operation or passing over the platform, interfering with operation of the rake, as specified.

DANIEL GUPTAIL.

Witnesses:
JAMES S. TAYLOR,
JAMES COLEMAN.